2 Sheets—Sheet 1.

W. W. KNOWLES,

Assignor, by mesne assignments, to J. B. SAVAGE and THE ATWATER MANUFACTURING COMPANY and W. W. WOODRUFF.

METHOD OF FORMING CARRIAGE STEPS.

No. 9,929. Reissued Nov. 15, 1881.

Witnesses.
John Edwards Jr.
Lyman D. Burr

Inventor.
Wilson W. Knowles,
By James Shepard
Atty

N. PETERS, Photo-Lithographer, Washington, D. C.

W. W. KNOWLES,

Assignor, by mesne assignments, to J. B. SAVAGE and THE ATWATER MANUFACTURING COMPANY and W. W. WOODRUFF.

METHOD OF FORMING CARRIAGE STEPS.

No. 9,929. Reissued Nov. 15, 1881.

Witnesses.
John Edwards Jr.
Lyman D. Burr

Inventor.
Wilson W. Knowles
By James Shepard.
atty

N. PETERS, Photo-Lithographer, Washington, D. C.

UNITED STATES PATENT OFFICE.

WILSON W. KNOWLES, OF PLANTSVILLE, ASSIGNOR, BY MESNE ASSIGNMENTS, TO J. B. SAVAGE AND THE ATWATER MANUFACTURING COMPANY, OF SOUTHINGTON, AND WALTER W. WOODRUFF, OF MOUNT CARMEL, CONN.

METHOD OF FORMING CARRIAGE-STEPS.

SPECIFICATION forming part of Reissued Letters Patent No. 9,929, dated November 15, 1881.

Original No. 104,040, dated June 7, 1870. Application for reissue filed July 11, 1881.

*To all whom it may concern:*

Be it known that I, WILSON W. KNOWLES, of Plantsville, in the county of Hartford, and in the State of Connecticut, have invented a certain new and useful Method of and Dies for Forming Carriage-Steps; and I do hereby declare that the following is a full, clear, and exact description thereof, reference being had to the accompanying drawings making a part of this specification, in which—

Figure 1:
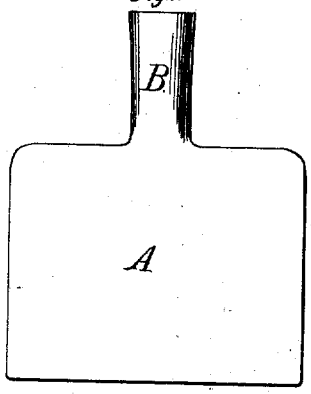
Figure 2:
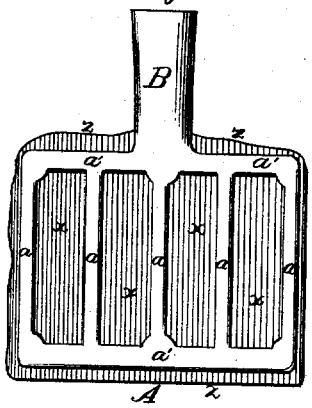
Figure 3:
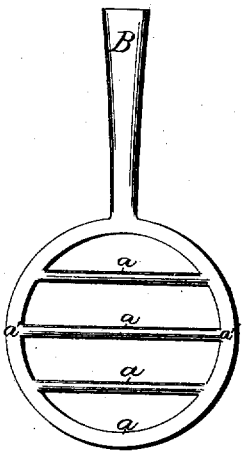
Figure 4:
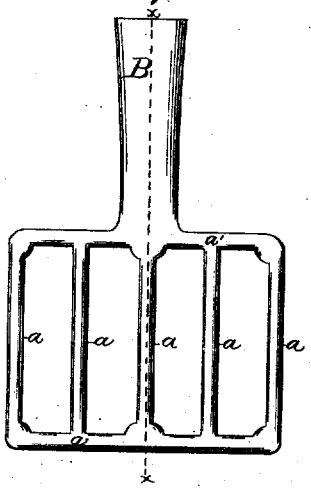
Figure 5:
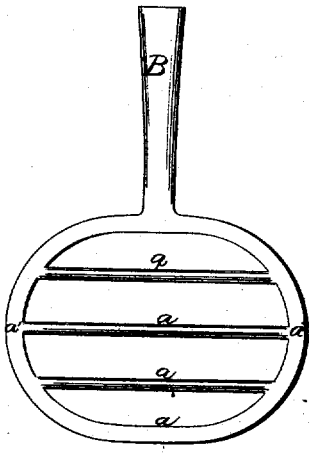
Figure 6:
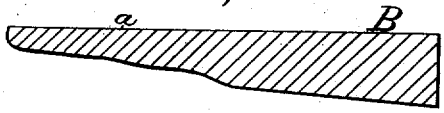
Figure 10:
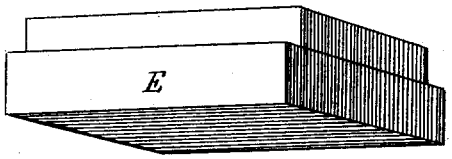
Figure 7:
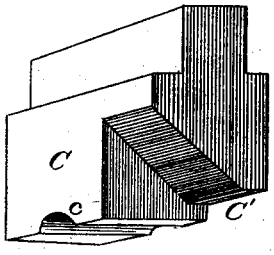
Figure 11:
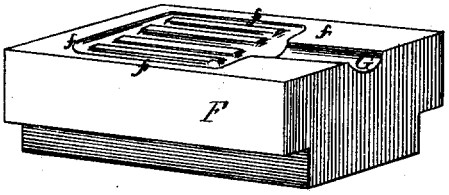
Figure 8:
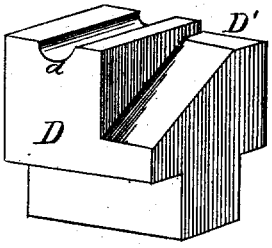
Figure 12:
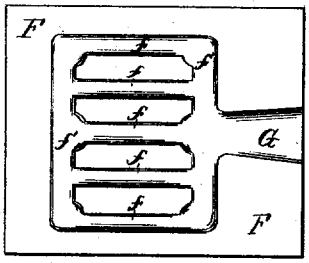
Figure 9:
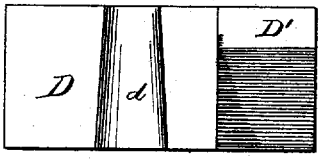

Figure 1 is a plan view of a rough blank used in forming a step. Fig. 2 is a like view of the lower side of said blank after it has been further operated upon by forming-dies. Figs. 3 and 5 show two modifications in the form of the steps. Fig. 4 is a view of the lower side of a completed step. Fig. 6 is a sectional view of the same, taken on line *x x* of Fig. 4. Figs. 7 and 8 are perspective views of the dies used for forming the shank of the step. Fig. 9 is a plan view of the face of the same. Fig. 10 is a perspective view of the upper die for forming the step. Fig. 11 is a like view of the corresponding lower die, and Fig. 12 is a plan view of the face of the latter.

Letters of like name and kind refer to like parts in each of the figures.

As ordinarily constructed, carriage-step pads are cut from sheet metal and properly shaped, after which they are welded to the shank; but experience has proved that this method is open to serious objections, on account of the inferior quality of the work and also the cost of its production.

To obviate these objections is the design of my invention, which consists, principally, in producing a carriage-step, substantially such as is herein shown and described, from a solid bar of iron without welding by means of the hereinafter-described method.

It also consists in the employment of a series of dies for use successively in forming or shaping said step, by means of which dies a better and more accurately-finished article is secured, and time and labor economized in its production, as is hereinafter shown and described.

In the manufacture of carriage-steps by my method a series of dies are successively used in connection with one or more drop-presses, the lower die of each pair being stationary within the bed-plate, while the upper one is attached to and carried by a ram or drop, and caused to impinge upon the work placed within or upon the lower die, and thereby give to said work the desired form.

In order to form the step-blank A, a bar of iron having a suitable size is heated, and the shank B formed by means of the primary set of dies C and D, seen in Figs. 7 and 8, which dies are provided at one side with corresponding peening faces C′ and D′ for roughly drawing out said shank, and have sunk within their contiguous horizontal and parallel faces corresponding half-round grooves *c* and *d*, within the latter of which said shank is placed and completed by a few blows from the upper die. The opposite end is forged under a trip or drop hammer until the required shape and dimensions are roughly obtained, leaving the blank in the form shown in Fig. 1. A second set of dies are now employed to give form to the step-pad. These dies, when adapted to produce the particular form of step shown in Fig. 4, are represented in Figs. 10 and 11, the upper one of which, E, has a plane horizontal face, while the lower die, F, is provided with a series of half-round grooves, *f*, arranged parallel with each other, and connected together at their ends by means of two other grooves, *f′*, placed at a right angle with the former. A larger half-round groove, G, corresponding in size with the shank B, extends from the outer edge of the die into and through one of the transverse grooves, *f′*, and connects with the center one of the grooves *f*.

In order to furnish room below the surface of the die F for the increased size or swell of the shank B, the groove G is made much lower at its outer than at its inner end, and from its size, being somewhat deeper at its point of intersection than the grooves *f* and *f′*, the latter and the center one of said grooves *f* (see transverse section of step, Fig. 6) are made to incline downward from their outer ends to the bottom of said groove G, by which construction the bars formed within said deepened grooves have a gradually increasing depth from their outer ends to their point of union with the shank. After reheating, the blank shown in Fig. 1 is placed between the forming-dies E and F and receives a number of blows, which will cause it to fill said die and assume the shape shown in Fig. 2, the metal being forced downward and sidewise, so as to raise and form the bars *a* and *a'*, leaving them connected by means of a thin diaphragm, *x*, and also leaving a fin, *z*, of corresponding thickness projecting horizontally from the edge of the step. The surplus metal, consisting of the diaphragm *x* and fin *z*, is then removed by means of suitable trimming-dies, after which the step is placed between the finishing-dies and completed, as shown in Fig. 3, by means of a few blows.

The finishing-dies are of the same general form as those in which the step received its shape.

Although I preferably construct steps in the form shown in Fig. 4, a great variety of other forms can be given to them. As an illustration of a slight change in form, Figs. 3 and 5 show two steps in which the bars *a* are placed at a right angle to instead of in a line with the shank B, while a circular or an oval shape is given to the exterior of said step. Other changes will readily suggest themselves, but it is not thought necessary to illustrate or describe them.

It is, of course, evident that whatsoever change is made in the step-pad a corresponding change must be made in the dies which throw the blank, Fig. 1, into the general form of the finished step.

As thus formed, the step and shank are composed of the same quality of metal, which, from the peculiar action of the dies forcing it downward and sidewise, has all the toughness and tenacity of hammered iron, and, being without wield, no breakage can occur from a defect in the workmanship. In addition to the above there is a decrease in the cost of the finished article, which results from the saving in material caused by forcing a portion of the iron that would otherwise be wasted sidewise into the bars, and also from the lessened amount of time and labor required in the production of the same. The step which is the product of these dies and process is the subject of an independent patent granted to myself.

Having thus fully set forth the nature and merits of my invention, what I claim as new, and desire to secure by Letters Patent, is—

1. The hereinbefore-described method of forming carriage-steps, substantially such as herein shown and described, from a solid bar of iron without welding, which consists in roughly drawing out and rounding the shank in dies, flattening out the step end into a blank of a form approximating the step-pad to be produced, subjecting the same to the forming-dies and then to suitable trimming-dies, substantially as described, and for the purpose specified.

2. The series of dies for forming carriage-steps, consisting of the shank drawing and rounding dies and the step-forming dies, substantially as described, and for the purpose specified.

WILSON W. KNOWLES.

Witnesses:
M. A. LEWIS,
MARY J. LEWIS.